United States Patent [19]

Hirashima et al.

[11] Patent Number: 4,823,135
[45] Date of Patent: Apr. 18, 1989

[54] SATELLITE RECEIVER HAVING IMPROVED POLARIZATION PLANE DETERMINATION MEANS

[75] Inventors: Masayoshi Hirashima, Ibaraki; Osamu Shizuya, Takatsuki; Noriaki Omoto, Ibaraki, all of Japan

[73] Assignee: Matsushita Electric Industrial Co., Ltd., Kadoma, Japan

[21] Appl. No.: 914,159

[22] Filed: Oct. 1, 1986

[30] Foreign Application Priority Data

Oct. 1, 1985 [JP] Japan ................................. 60-218210
Oct. 1, 1985 [JP] Japan ................................. 60-218212

[51] Int. Cl.⁴ ............................................ H01Q 21/06
[52] U.S. Cl. .................................... 342/362; 343/756; 455/12; 333/21 A
[58] Field of Search ............... 342/361, 362, 363, 364, 342/365, 366; 343/756, 909; 455/12; 333/21 A

[56] References Cited

U.S. PATENT DOCUMENTS

| Re. 28,546 | 9/1975 | Foldes | 342/361 |
| 3,914,764 | 10/1975 | Ohm | 342/366 |
| 3,931,623 | 1/1976 | Sones et al. | 455/12 |
| 4,336,542 | 6/1982 | Bielli et al. | 342/362 |
| 4,538,175 | 8/1985 | Balbes et al. | 455/12 |
| 4,586,081 | 4/1986 | St. Arnaud et al. | 358/86 |
| 4,604,624 | 8/1986 | Amitay et al. | 342/361 |

FOREIGN PATENT DOCUMENTS

| 0132382 | 1/1985 | European Pat. Off. | 455/12 |
| 3406621 | 5/1985 | Fed. Rep. of Germany | 455/12 |

Primary Examiner—Theodore M. Blum
Assistant Examiner—David Cain
Attorney, Agent, or Firm—Cushman, Darby & Cushman

[57] ABSTRACT

A satellite TV receiver for receiving a satellite broadcasting, wherein neighboring televison signals are vertical and horizontal polarized waves, and wherein a polarizer for the satellite receiver controls an antenna so that the polarization plane of the antenna is adapted to the polarization plane of television signal to be received. The receiver further includes a narrow band-pass filter for rejecting terrestrial interference so that the desired polarization plane can be more easily determined.

6 Claims, 9 Drawing Sheets

FIG. 4 (A) (PRIOR ART)
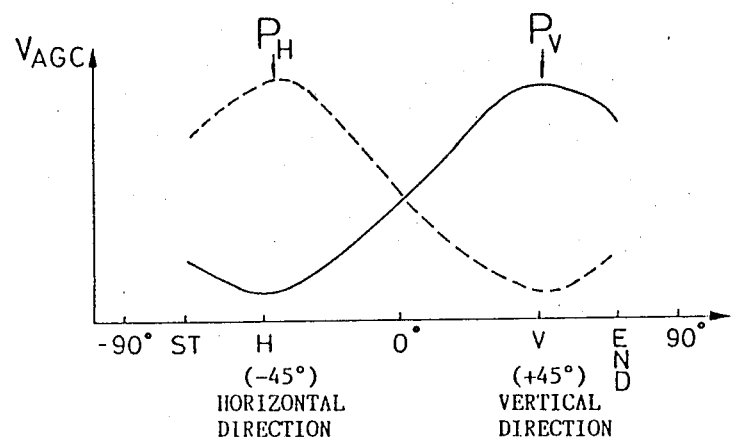
FIG. 4 (B) (PRIOR ART)
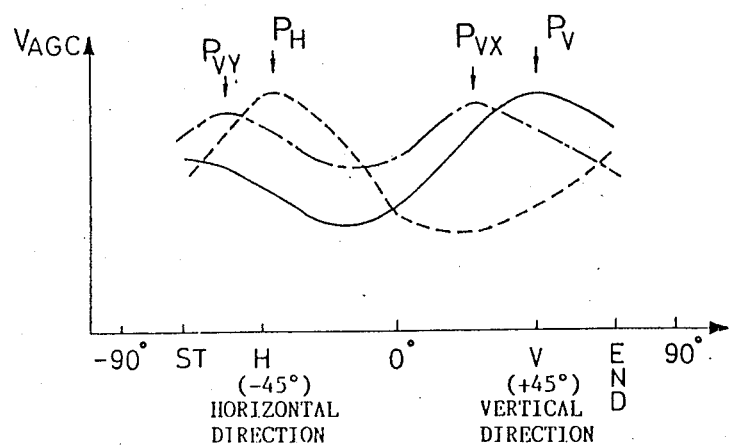

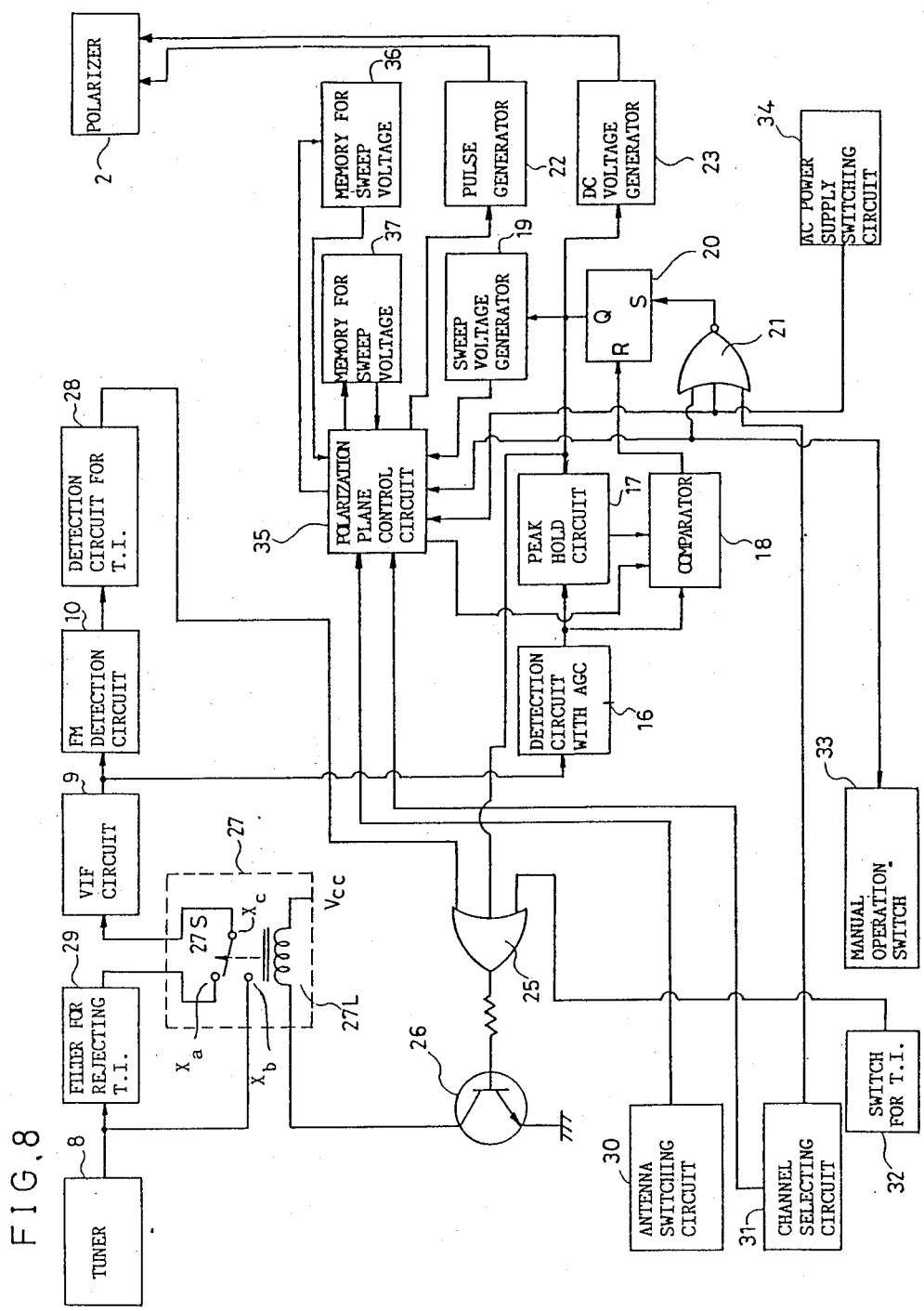

SATELLITE RECEIVER HAVING IMPROVED POLARIZATION PLANE DETERMINATION MEANS

FIELD OF THE INVENTION AND RELATED ART STATEMENT

1. Field of the Invention

The present invention relates to a satellite receiver and more particularly a satellite receiver which has an improved polarizer for controlling the polarization plane of the antenna.

2. Description of the Prior Art

A conventional satellite receiver has a structure and operation as described hereafter with reference to FIG. 1.

In the United States of America and other countries, television signals used in satellite broadcasting on a 4 GHz band (C band) consist of a vertically polarized wave and a horizontally polarized wave. For example, when television signals of 24 channels (from 3.72 to 4.18 GHz) are transmitted from a satellite, the vertically polarized wave and the horizontally polarized wave are used for odd number channels and even number channels, respectively. Each channel occupies a bandwidth of 40 MHz, and their interval between neighboring channels is 20 MHz.

With reference to FIG. 1, a television signal reflected by a reflector 1 of an antenna 50 is received in a polarizer 2 for a polarization plane. A Low Noise Booster (L.N.B.) 3 converts the signal received from the polarizer 2 into signals having frequencies of 970 MHz to 1430 MHz. The L.N.B. 3 is supported on the reflector 1 by supporting members 4a and 4b. Antenna 50 is supported by an antenna supporting member 6, and its angle of elevation and its direction are variable.

The output from the L.N.B. 3 is inputted to a receiving circuit 7 via cable 5. The receiving circuit 7 comprises a tuner 8, a video intermediate frequency circuit 9, an FM detection circuit 10, a sound signal detection circuit 11, a video signal processing circuit 12, a sound signal processing circuit 13, a radio frequency (RF) converter 14 and an automatic polarization control circuit 15. Using the tuner 8, a desired channel is selected, and a selected frequency is converted into the intermediate frequency of 510 MHz. The intermediate frequency signal has a bandwidth of 25 MHz and is inputted into the video intermediate frequency (VIF) circuit 9 having a band-pass filter (B.P.F.) that has bandwidth of 24 MHz. The output from the VIF circuit 9 is inputted to the FM detection circuit 10 and the automatic polarization control circuit 15. The output of the FM detection circuit 10 is inputted into sound signal detection circuit 11, which outputs the detected sound signal to the processing circuit 13 which converts the signal into a proper signal having a desirable level and frequency. The output of FM detection circuit 10 is also inputted into video signal processing circuit 12, which cuts off high frequency components above 4.2 MHz, and the outputs of the processing circuits 12 and 13 are inputted into the RF converter 14.

The automatic polarization control circuit 15 controls the polarizer 2 to vary the polarization plane and stops the polarizer 2 at a desired position. FIG. 2 shows a block diagram of the automatic polarization control circuit 15. A spectrum of a signal from a satellite is as shown in FIG. 3(A). In this spectrum, channel N is a desired channel and channels N−1 and N+1 are neighboring channels. In this case, each channel has the same signal level, and channels N−1 and N+1 are of a horizontally polarized wave, whereas channel N is of a vertically polarized wave, as shown in FIG. 3(A). Center frequencies of channels N−1, N and N+1 are 490 MHz, 510 MHz and 530 MHz, respectively. When a polarization plane of the polarizer 2 is in a middle position between the vertical and horizontal planes, the influences induced by the polarizer 2 are the same for both cases of vertical and horizontal polarization planes, and the output of the VIF circuit 9 including the band-pass filter having a characteristic as in FIG. 3(B) becomes as shown by FIG. 3(C).

When the polarizer 2 is set for a vertically polarized wave, signals of the neighboring channels N−1, N+1 are reduced as shown by the broken line in FIG. 3(A). Thus, the signals of neighboring channels become smaller than the desired channel N by about 15 dB, when an isolation factor of the polarizer 2 is selected to be 15 dB. Therefore, the spectral characteristic of the output of the VIF circuit 9 becomes as shown by FIG. 3(D).

A relation between the polarization plane of the polarizer 2 and the output of the detection circuit 16 with automatic gain control of polarization control circuit 15 is shown by a solid line in FIG. 4(A) when the received wave is a vertically polarized wave. The detection circuit 16 with AGC issues a D.C. voltage corresponding to the output of video intermediate frequency circuit 9 and controls the gain of the tuner 8. Therefore, when the polarization plane of the polarizer 2 becomes vertical and thus the signal amplitude becomes a maximum, the output of detection circuit 16 with AGC becomes a maximum. The maximum point is shown by $P_V$ in FIG. 4(A).

A relation between the polarization plane of the polarizer 2 and the output of the detection circuit 16 when a horizontally polarized wave is received is shown by a broken line in FIG. 4(A). The maximum point is shown by $P_H$ in FIG. 4(A).

The operation of the automatic polarization control circuit 15 is described hereafter with reference to FIGS. 2 and 3. When channel selection is made to select the channel N, a channel changing pulse is inputted to NOR gate 21 and makes the output level of NOR gate 21 low. The low output level of NOR gate 21 is inputted to a set terminal S of a flip-flop 20 and sets the flip-flop 20. The high level output Q of the flip-flop 20 operates a DC power generator 23 to feed the voltage to the polarizer 2 and operates a sweep voltage generator 19 which operates a pulse generator 22 to feed the control signal to the polarizer 2. The pulse generator 22 outputs pulses, which have widths corresponding to the width of the sweep voltage. The polarization plane of the polarizer 2 is determined by the width of output pulses from the pulse generator 22. Also, the output pulse of NOR gate 21 is also inputted to a peak hold circuit 17 to reset the holding voltage of the peak hold circuit 17.

As shown in FIG. 4(A), the polarization plane of the polarizer 2 is varied from a starting point ST to an ending point END. In this operation, the detection output from the detection circuit 16 becomes a maximum value at a point V (+45°) in which the polarization plane of the polarizer 2 becomes vertical. At the point V, the detecting output is held by the peak hold circuit 17 as peak voltage $P_V$. After reaching the ending point END, the polarization plane is varied again from the starting point ST. In this second operation, the comparator 18 compares the detecting output from the detection circuit 16 with the maximum detecting output which was held in the first operation, and when the detecting output from the detection circuit 16 reaches the held maximum detecting output, the comparator 18 resets the flip-flop 20. Therefore, the polarization plane of the polarizer 2 is stopped at the point V.

When the signal level of a desired channel N is smaller than that of neighboring channel N+1 or N−1, by 4 to 5 dB, a spectrum of the signal from a satellite is shown by the solid line in FIG. 5(A). When the polarizer 2 is set for a horizontally polarized wave, the received signal level is shown by the broken line in FIG. 5(A), and the output of VIF circuit 9 which comprises the band-pass filter having a characteristic as shown in FIG. 5(B), is shown by FIG. 5(D). In this case, a relation between the polarization plane of the polarizer 2 and the output of the detection circuit 16 is shown by a chain line in FIG. 4(B). As shown in FIG. 4(B), the higher signal level of neighboring channels makes the peak point shift from the desired point $P_V$ to $P_{VX}$. Further, when the influence from neighboring channels is larger than that in the above case, an erroneous peak point $P_{VY}$ is higher than the point $P_{VX}$. Thus, when the polarizer 2 is stopped at the point $P_{VX}$ or $P_{VY}$, the output of VIF circuit 9 becomes as shown by FIG. 5(C).

As described above, in such a prior art satellite receiver, the desired polarization plane of the polarizer 2 cannot be determined when the signal level of the desired channel is smaller than that of neighboring channels. Further, because of terrestrial interference of 500 MHz or 520 Mz, the satellite receiver cannot determine the desired polarization plane of the polarizer 2.

OBJECT AND SUMMARY OF THE INVENTION

It is an object of the invention to provide an improved satellite receiver which can determine the desired polarization plane without the liability of erroneous operation.

A satellite receiver in accordance with the present invention comprises:

an antenna for receiving plural satellite television signals having different polarization planes, a polarizer for varying a polarization plane of the antenna, polarizer control means responsive to a received satellite television signal for controlling the polarization plane of the antenna for adaptation of the polarization plane of the antenna to a polarization plane of the television signal to be received, a first band-pass filter having a first passing bandwidth narrower than a transmission bandwidth allotted for receiving one channel of the plural satellite television signals, the first band-pass filter being provided in a television signal input path of the polarizer control means for feeding a control signal based on a signal of the first bandwidth to the polarizer control means, and a second band-pass filter having a second passing bandwidth wider than the first passing bandwidth of the first band-pass filter, the second band-pass filter being provided in a television signal input path of the television signal reproducing part.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIGS. 4(A) and 4(B) are the graphs showing the relation between the polarization plane of the polarizer 2 and the output of the detection circuit 16.

FIG. 8 is a block diagram of another embodiment of the satellite receiver of the present invention.

DETAILED DESCRIPTION OF THE PREFERRED EMBODIMENTS

Figure 1:
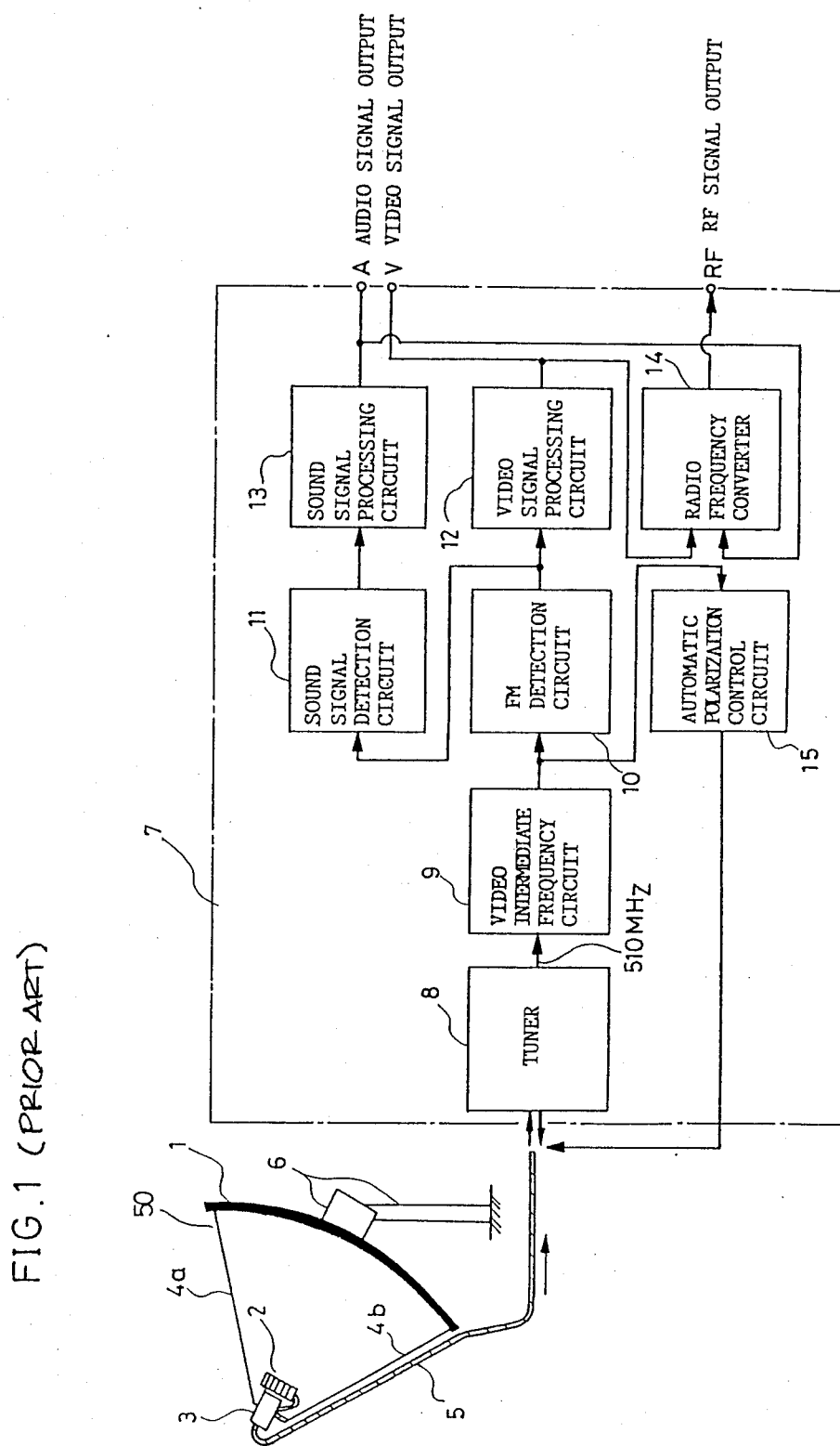
FIG. 1 is a block diagram of a satellite receiver of the prior art.
Figure 2:
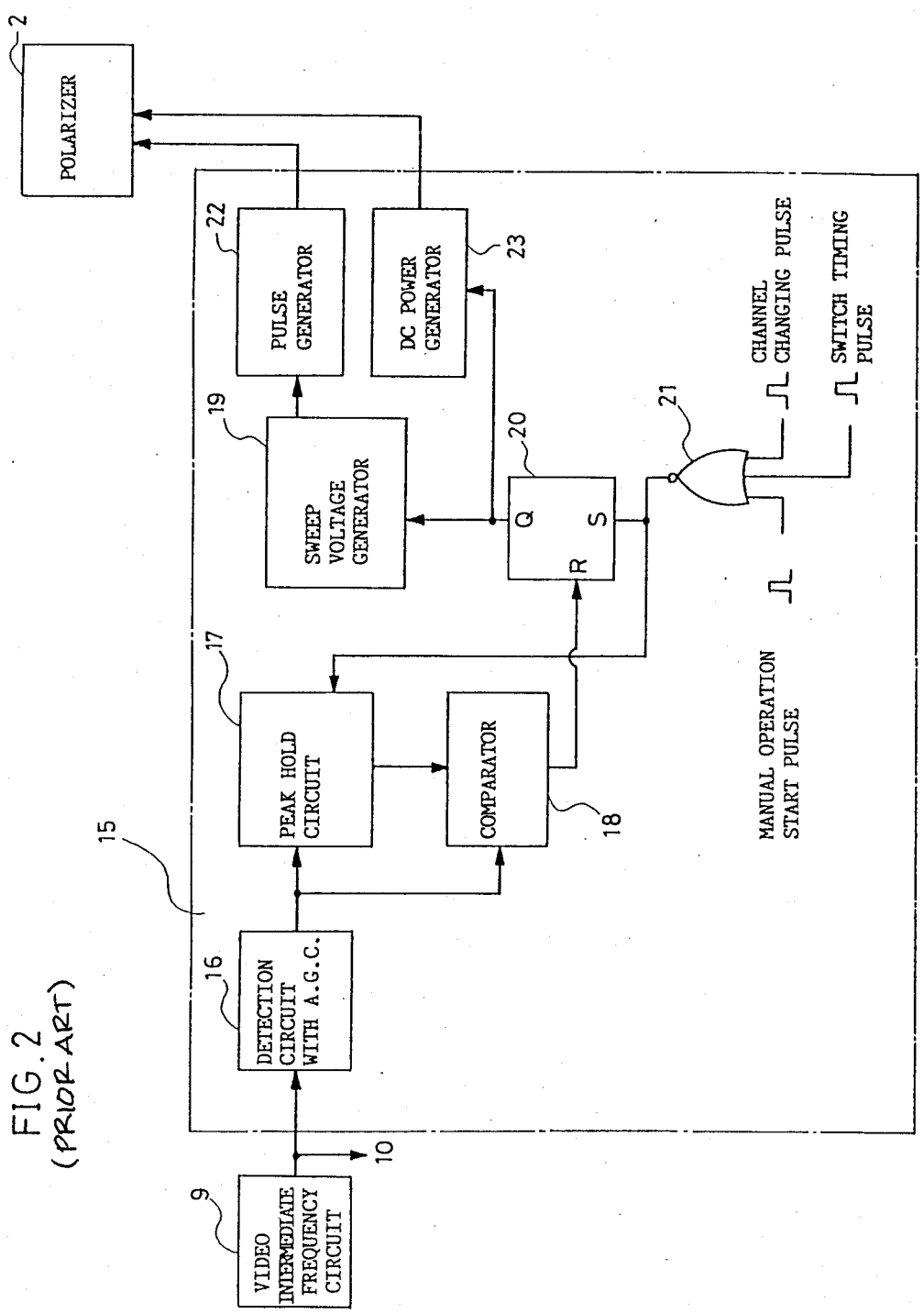
FIG. 2 is a block diagram of an automatic polarization control circuit 15 of the satellite receiver illustrated in FIG. 1.
Figure 3A:
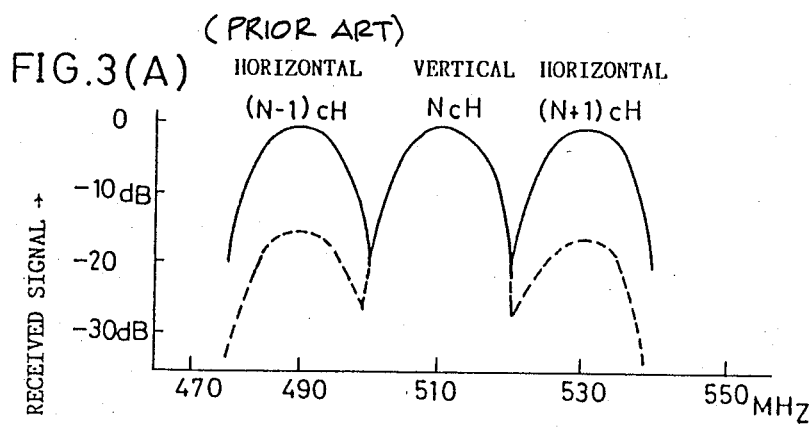
FIG. 3(A) is the graph showing the spectrum of the received signal received by the receiver of FIG. 1.
Figure 3B:
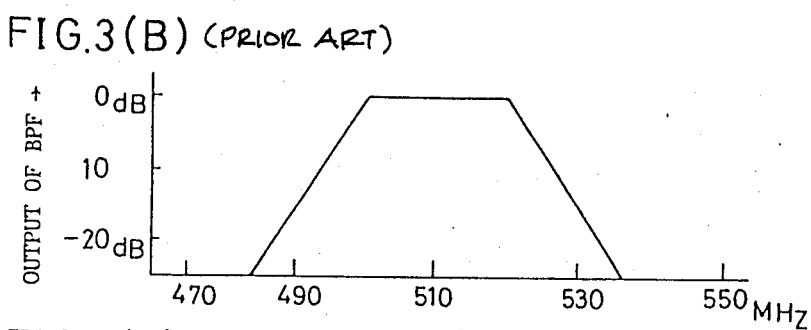
FIG. 3(B) is the graph showing the characteristic of the band-pass filter of video intermediate frequency circuit 9.
Figure 3C:
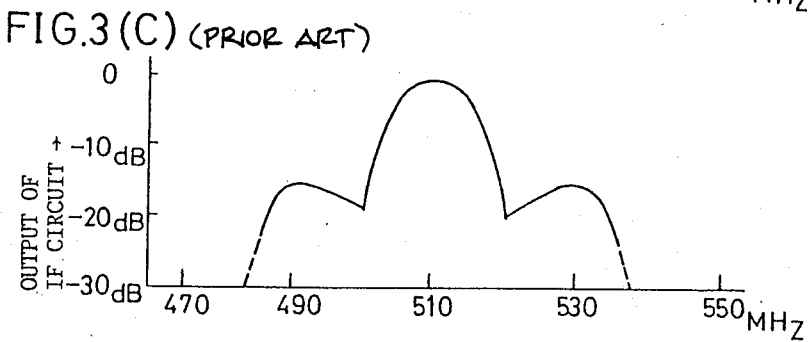
FIGS. 3(C) and 3(D) are the graphs showing the output of video intermediate frequency circuit 9.
Figure 3D:
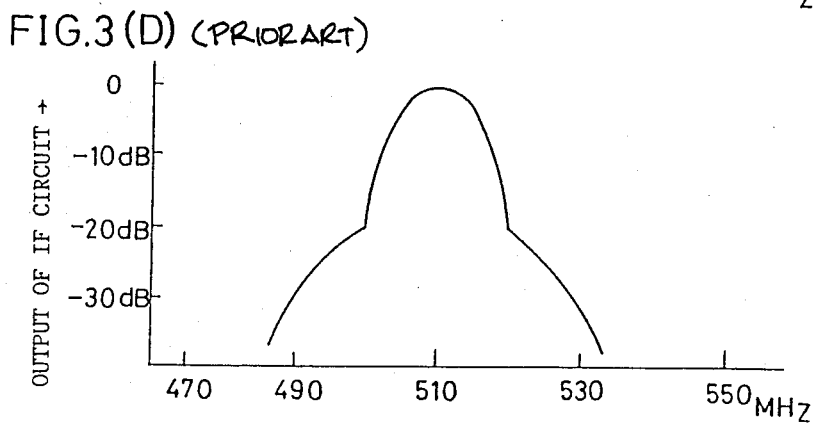
Figure 5A:
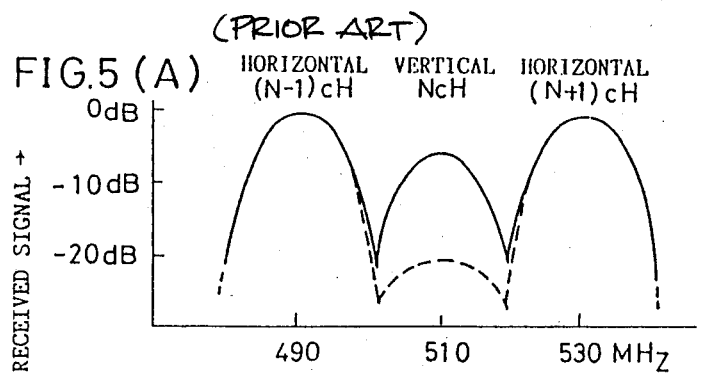
FIG. 5(A) is the graph showing the spectrum of the received signal, when the signal of a desired channel is smaller than neighboring channels.
Figure 5B:
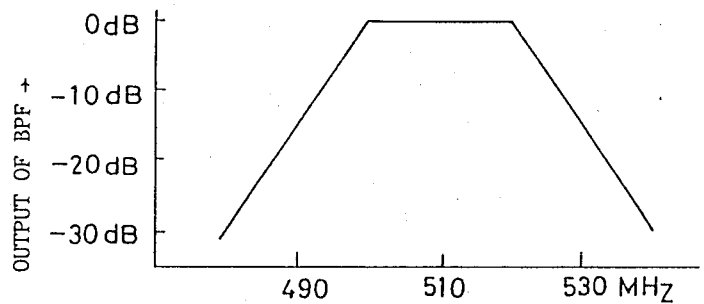
FIG. 5(B) is the graph showing the characteristic of the band-pass filter of the video intermediate frequency circuit 9.
Figure 5C:
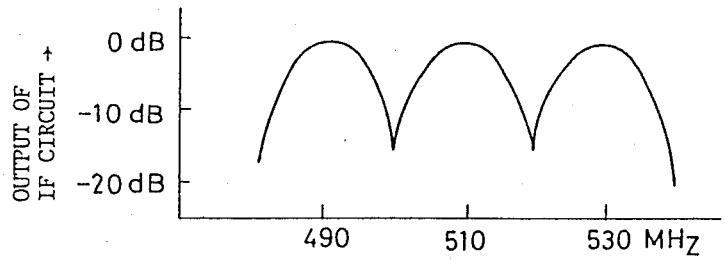
FIGS. 5(C) and 5(D) are the graphs showing the output of VIF circuit 9.
Figure 6:
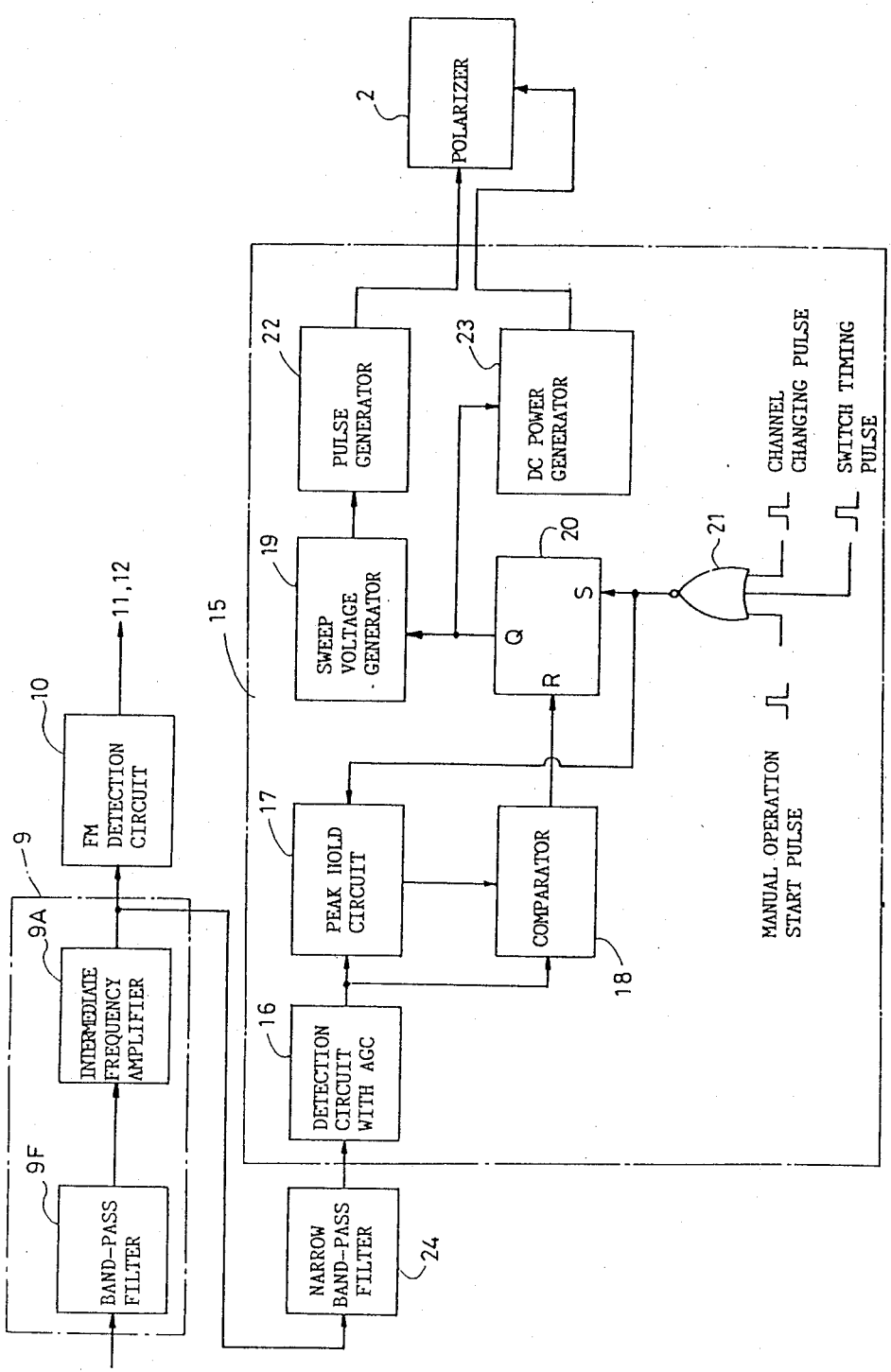
FIG. 6 is a partial block diagram of the preferred embodiment of the satellite receiver of the present invention.

FIG. 6 shows a block diagram of the preferred embodiment of the satellite receiver of the present invention. In FIG. 6, a video intermediate frequency circuit (hereinafter VIF circuit) 9 comprises a band-pass filter 9F having a characteristic shown in FIG. 5(B) and an intermediate frequency amplifier 9A. The VIF circuit 9 receives an output from a tuner (not shown). The output of VIF circuit 9 then is inputted to an FM detection circuit 10 and an automatic polarization control circuit 15 through a band-pass filter 24 having a narrow passband width. Using the tuner, a desired channel is selected, and the selected frequency is converted into an intermediate frequency signal of 510 MHz. The intermediate frequency signal has a bandwidth of 25 MHz.

Figure 5D:
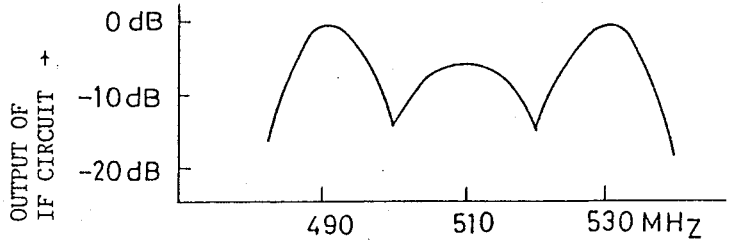
Figure 7:
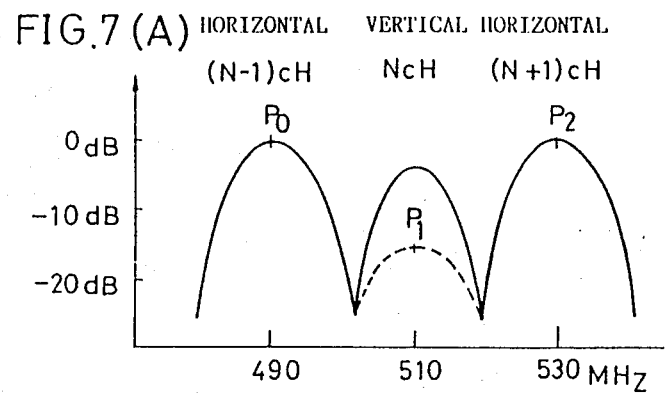
FIG. 7(A) is a graph showing the spectrum of a received signal when the signal of a desired channel is smaller than that of neighboring channels.
FIG. 7(B) is a graph showing a characteristic of narrow band-pass filter 24.
FIG. 7(C) is a graph showing the output signal of VIF circuit 9.
Figure 7:
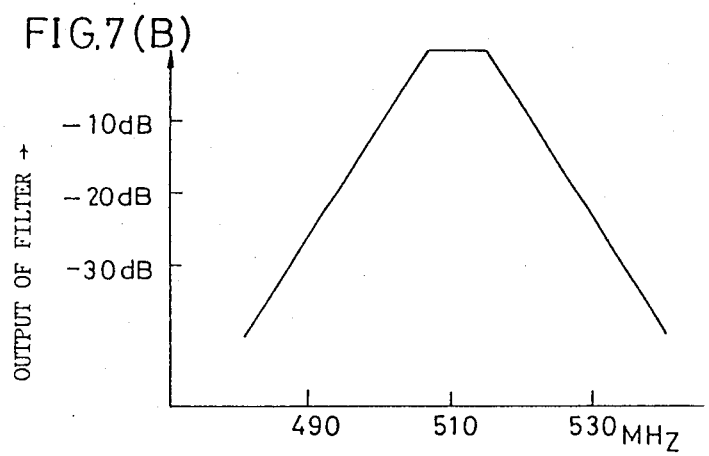
Figure 7:
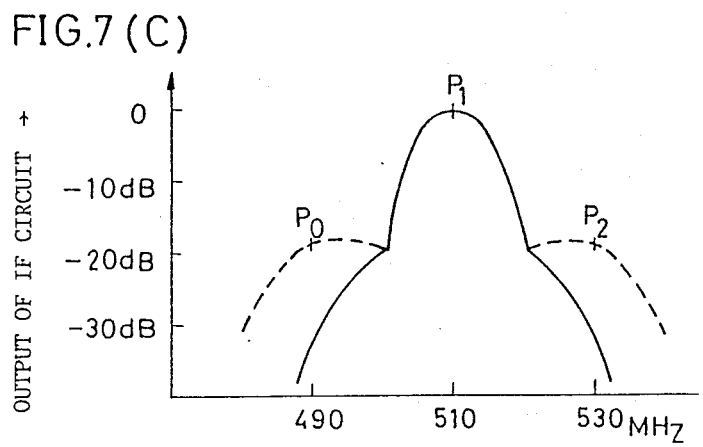

A spectrum of the signal from a satellite is shown by the solid line in FIG. 7(A). In this case, it is provided that the signal level of a desired channel, e.g. N, is smaller than that of neighboring channel N+1 or N−1 by 4 to 5 dB, and channels N−1 and N+1 are horizontally polarized waves, whereas channel N is a vertically polarized wave. When the polarizer 2 is set for a horizontally polarized wave, the received signal level is shown by the broken line in FIG. 7(A), and the output of VIF circuit 9 is shown by FIG. 5(D). The output of VIF circuit 9 is inputted to the narrow band-pass filter 24 which has narrow bandwidth of 12 MHz compared to the bandwidth (24 MHz) of the signal transmitted from the satellite. Even when the polarizer 2 is set for a horizontally polarized wave against the vertically polarized wave of the desired channel N, and the signal level of desired channel N is smaller than that of the neighboring channel N+1 or N−1 by 5 dB, in the output of the narrow band-pass filter 24 the signal level of desired channel N is larger than neighboring channels N−1 and N+1 by 20 dB as shown by the broken line in FIG. 7(C). Further, when the polarizer 2 is set for a vertically polarized wave, in the output of the narrow band-pass filter 24 the signal level of the desired channel N is larger than that of the neighboring channels by 35 dB as shown by the solid line in FIG. 7(C). Anyway, because the signal level of the desired channel N is larger than that of the neighboring channels by at least 20 dB irrespective of the polarization plane of polarizer 2, the relation between the polarization plane of polarizer 2 and the output of the detection circuit 16 becomes as shown by the solid line in FIG. 4(A). Therefore, the desired polarization plane can be easily determined. In another embodiment, the band-pass filter having the same characteristic as the band-pass filter 9F is used as the narrow band-pass filter.

FIG. 8 shows another satellite receiver with a filter for rejecting terrestrial interference embodying the present invention. In the USA, there are some terrestrials on frequencies which are apart from the center frequencies of satellite television by plus or minus 10 MHz. The terrestrial influences the AGC voltage to induce erroneous undesirable determinations of the polarization plane of polarizer 2 or to induce noise on the displayed picture. Therefore, the filter for rejecting terrestrial interferences is provided in accordance with the present invention.

Figure 9A:
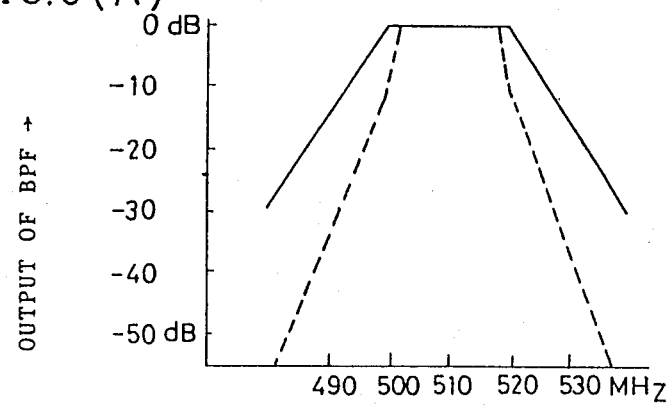
FIG. 9(A) is a graph showing the characteristic of a band-pass filter.
Figure 9B:
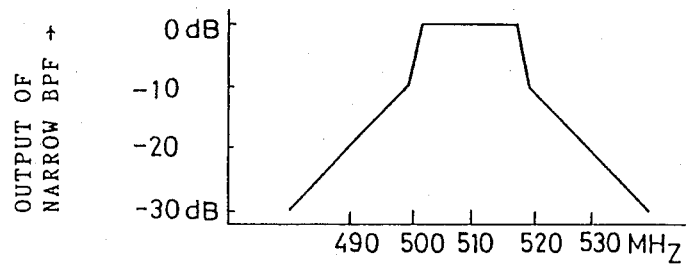
FIG. 9(B) is a graph showing the characteristic of a filter for rejecting terrestrial interference.

In FIG. 8, the video intermediate frequency circuit (VIF circuit) 9 comprises a band-pass filter having a characteristic shown by the solid line in FIG. 9(A) and an intermediate frequency amplifier. A narrow band-pass filter 29 for rejecting terrestrial interference having a characteristic as shown in FIG. 9(B) with a bandwidth of 20 MHz or less is provided between the tuner 8 and VIF circuit 9 in this embodiment.

Figure 9C:
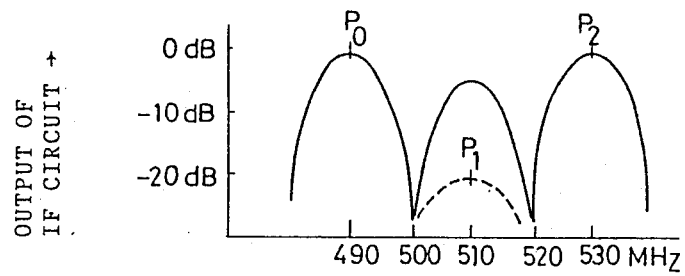
FIG. 9(C) is a graph showing a spectrum of a received signal when the signal of a desired channel is smaller than neighboring channels.
Figure 9D:
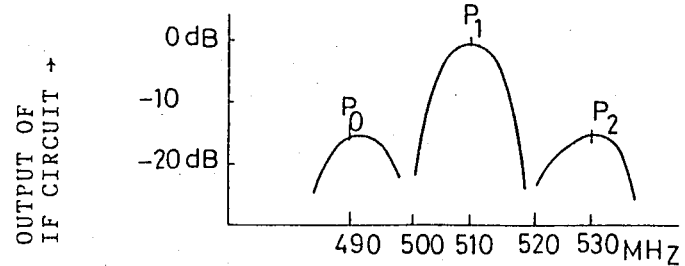
FIG. 9(D) is a graph showing the output of VIF circuit 9.

A spectrum of the signal from a satellite is shown by the solid line in FIG. 9(C). In this case, the signal level of the desired channel N is smaller than that of neighboring channel N+1 or N−1 by 4 to 5 dB, and channels N−1 and N+1 are horizontally polarized waves, while channel N is a vertically polarized wave. When the polarizer 2 is set for a horizontally polarized wave, the received signal level is shown by a broken line curve in FIG. 9(C). The output of tuner 8 is inputted to filter 29 for rejecting terrestrial interference which has a narrower bandwidth than the bandwidth of a signal transmitted from the satellite. Then, the output of filter 29 for rejecting terrestrial interference is inputted to VIF circuit 9 comprising the band-pass filter. The combined characteristic of filter 29 for rejecting terrestrial interference and the band-pass filter of VIF circuit 9 is shown by a broken line curve in FIG. 9(A). Therefore, the output of VIF circuit 9 becomes as shown in FIG. 9(D). Even when the polarizer 2 is set for a horizontally polarized wave against the vertically polarized wave of desired channel N and the signal level of desired channel N is smaller than neighboring channel N+1 or N−1 by 5 dB, in the output of VIF circuit 9 the signal level of desired channel N is larger than the neighboring channels by 15 dB as shown in FIG. 9(D). Further, when the polarizer 2 is set for a vertically polarized wave, in the output of VIF circuit 9 the signal level of desired channel N is larger than that of the neighboring channels by 30 dB. Anyway, because the signal level of desired channel N is larger than that of the neighboring channels by at least 15 dB, irrespective of the polarization plane of polarizer 2, the relation between the polarization plane of polarizer 2 and the output of detection circuit 16 becomes as shown by the solid line in FIG. 4(A). Therefore, the desired polarization plane can be easily determined.

In this embodiment, memories 36 and 37 for storing data of the sweep voltage are provided to quickly determine the desired polarization plane of polarizer 2. The memory 36 is provided for a vertically polarized wave and the memory 37 is provided for a horizontally polarized wave. When AC power supply switching circuit 34 is closed or an antenna switching circuit 30 is operated for changing an angle of the antenna, a polarization plane control circuit 35 clears the memories 36 and 37. Then, by selecting the desired channel N having vertical polarization by a channel selecting circuit 31, a channel changing pulse is inputted to NOR gate 21. The channel changing pulse makes the output of NOR gate of a low level, and the low level output makes the output of a port Q of the flip-flop 20 of a high level. Therefore, a sweep voltage generator 19 generates a sawtooth wave. The sawtooth wave is inputted to a pulse generator 22 through the control circuit 35, and the pulse generator 22 outputs pulses which have a width corresponding to the width of the sweep voltage. The polarization plane of the polarizer 2 then is determined by the width of output pulses from the pulse generator 22. Therefore, the polarization plane of polarizer 2 is varied from a starting point ST to an ending point END.

In this operation, the detecting output from detection circuit 16 becomes a maximum value at a point V (+45°) in which the polarization plane of polarizer 2 becomes vertical. At the point V, the detecting output is held by the peak hold circuit 17 as a peak voltage P$_V$. After the ending point END, the polarization plane is varied again from starting point ST. In this second operation, the comparator 18 compares the detecting output from the detection circuit 16 with the maximum detecting output which was held in the first operation, and when the detecting output from the detection circuit 16 reaches the held maximum detecting output, the comparator 18 resets the flip-flop 20. Therefore, the polarization plane of polarizer 2 is stopped at the point V. At the same time, the sweep voltage at the point V is converted into a digital signal and stored in the memory 36 for use for the vertical polarization wave. In another embodiment, the pulse width of the output from the pulse generator 22 may be stored in the memory 36.

Next, when the channel X$_1$ which also has a vertical polarization wave is selected, the stored data in the memory 36 for the vertical polarization wave is read out. The read-out data is converted into an analog signal and inputted into the pulse generator 22. Therefore, the polarization plane of polarizer 2 is quickly changed to the vertical polarization (at the point V). Then, the control circuit 35 outputs the signal to the comparator 18, and by receiving this signal the comparator 18 resets the flip-flop 20. In the above-mentioned case, the polarization plane of polarizer 2 is quickly and accurately changed to the desired polarization plane of polarizer 2 irrespective of the signal level of the transmitted wave or undesirable interference.

When the channel $X_2$ which has a horizontal polarization wave is selected, the desired polarization plane of polarizer 2 is determined by sweeping operation from the point ST to the point END as shown by the broken line in FIG. 4(A). In this case, the sweep voltage at the point H is stored in the memory 37 used for the horizontal polarization wave.

In another embodiment, the control circuit 35 is constituted by a microprocessor.

A relay 27 connects contacts $X_a$ and $X_c$ during the determining operation for the polarization plane described above. After the determining operation, the relay 27 connects contacts $X_b$ and $X_c$ for directly connecting the tuner 8 and VIF circuit 9. Therefore, the bandwidth of the intermediate frequency circuit can be selected to be wide except in the determining operation. When the interference level due to terrestrial interference is larger than a predetermined level, a detection circuit 28 for terrestrial interference outputs the detection signal and turns ON transistor 26 through OR gate 25 when the switch 32 for terrestrial interference is activated. Therefore, the relay 27 connects the contacts $X_a$ and $X_c$, so that filter 29 for rejecting terrestrial interference is connected between the tuner 8 and VIF circuit 9. In another case, a manual operation switch 33 can forcedly operate the relay 27 for making the contact between the contacts $X_a$ and $X_c$.

As has been described in detail for various embodiments, using the satellite receiver in accordance with the present invention the polarization plane of a polarizer is quickly and accurately changed to a desired polarization plane.

Although the invention has been described in its preferred form with a certain degree of particularity, it is understood that the present disclosure of the preferred form may be changed in the details of construction and the combination and arrangement of parts may be resorted to without departing from the spirit and the scope of the invention as hereinafter claimed.

What is claimed is:

1. A satellite receiver for receiving satellite television signals at a television signal reproducing part thereof, comprising:
   an antenna for receiving plural satellite television signals having different polarization planes,
   a polarizer for varying a polarization plane of the antenna,
   polarizer control means responsive to a received satellite television signal for controlling the polarization plane of the antenna for adaptation of the polarization plane of the antenna to a polarization plane of the television signal to be received,
   a first band-pass filter having a first passing bandwidth narrower than a transmission bandwidth allotted for receiving one channel of the plural satellite television signals, said first band-pass filter being provided in a television signal input path of said polarizer control means for feeding a control signal based on a signal of said first bandwidth to said polarizer control means, and
   a second band-pass filter having a second passing bandwidth wider than said first passing bandwidth of said first band-pass filter, said second band-pass filter being provided in a television signal input path of said television signal reproducing part.

2. A satellite receiver in accordance with claim 1, wherein the polarizer control means comprises:
   changing means for changing the polarization plane of the antenna at least between a horizontal wave and a vertical wave,
   holding means for holding a maximum receiving signal level during the change made by the changing means, and
   selection means for selecting a suitable polarization plane of the antenna to be that at a reception point of maximum receiving signal level.

3. A satellite receiver in accordance with claim 1, wherein the polarizer control means comprises a memory for storing data for determining a suitable polarization plane of the antenna.

4. A satellite receiver in accordance with claim 1, wherein the first band-pass filter has a passing bandwidth of 20 MHz or less for rejecting terrestrial interference.

5. A satellite receiver in accordance with claim 4, wherein the first band-pass filter for rejecting terrestrial interference is connected as a preceding stage to said second band-pass filter.

6. A satellite receiver in accordance with claim 4, further comprising:
   switching means for operating the first band-pass filter so as to reject terrestrial interference at a condition of strong terrestrial interference, but not operating the first band-pass filter at a condition of weak terrestrial interference, and compulsorily operating the first band-pass filter during the operation for determining the desirable polarization plane.

* * * * *